March 29, 1949.  J. M. ROBINS  2,465,751
SWIVEL JOINT FOR REAR VIEW
MIRRORS AND THE LIKE
Filed Dec. 31, 1947
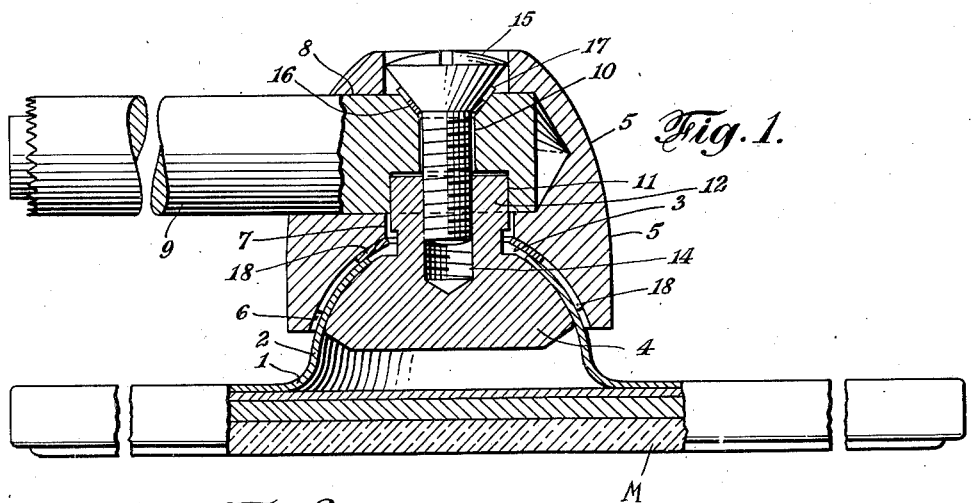
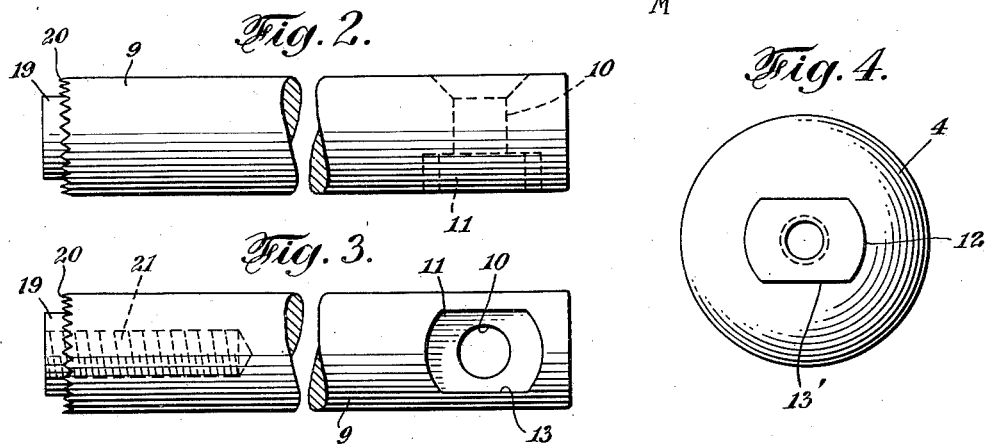
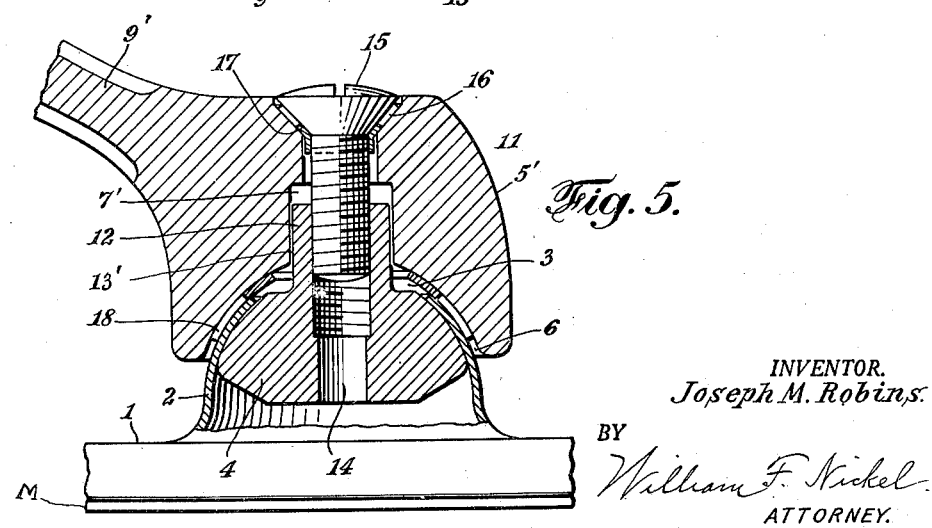
INVENTOR.
Joseph M. Robins.
BY
William F. Nickel
ATTORNEY.

Patented Mar. 29, 1949

2,465,751

UNITED STATES PATENT OFFICE 2,465,751

SWIVEL JOINT FOR REARVIEW MIRRORS AND THE LIKE

Joseph M. Robins, Norwalk, Conn., assignor to Roberk Company, Norwalk, Conn., a corporation of Connecticut Application December 31, 1947, Serial No. 794,859

2 Claims. (Cl. 248—289)

My invention is an improvement in adjustable supports to mount rear view mirrors for use on automobiles and other vehicles.

An object of this invention is to provide a support for an automobile mirror having the form of a durable, compact and efficient joint that movably secures the mirror upon an arm by which it is affixed to the automobile and permits the mirror to be easily adjusted; the device at all other times firmly holding the mirror in the desired position.

The invention is an improvement upon the construction set forth in the copending application of Elward B. Somers, Serial No. 621,889, for patent upon Swivel joint for rear view mirrors and the like, filed October 12, 1945, now Patent No. 2,436,678; and a further object is to provide a swivel joint of this kind which is simple in design and, further, adapted to be removably assembled with the arm that carries the mirror.

The nature and advantages of my improvement are clearly and amply set out in the following specification taken with the accompanying drawings illustrating two embodiments in which the principle of the invention is incorporated.

On said drawings,

Figure 1 is a view in transverse section of one form of the invention.

Figures 2 and 3 show the arm which the joint connects to the mirror.

Figure 4 shows a detail of part of the joint; and

Figure 5 is a view similar to Figure 1 of a modification.

Part of the casing for the mirror is indicated at 1, this casing being broad and flat, of any selected outline or shape, and exposing a plate with a reflecting surface through the front thereof. The plate appears at M and obviously it will be secured to the casing in any suitable way.

The back of the casing 1 has a hollow bulge or protuberance 2 with a central opening 3, through which passes one end of a ball-swivel element 4. This element lies within the bulge 2 and both are seated in a head 5 having a recess or concave seat 6. The head is upon the outer end of the arm which carries the mirror.

In Figure 1 the arm and head are illustrated as made separate and detachably connected to each other. The head 5 has a bore 7 extending from the bottom of the recess 6 through the head at the opposite end, and another bore 8 at right angles to the bore 7 and opening through one side only of the head. One end of the arm 9 is inserted into the bore 8; said end having a screw hole 10, at one extremity of which is an enlarged counterbore or recess 11. Two opposite sides of the recess 11 are curved and the other two sides are flat as shown at 13 in Figure 4. The neck or projecting boss 12 of the ball-swivel 4 passes into the bore 7 at the inner end of the latter and enters the recess 11. This neck is round but also has two flat surfaces 13', so that the ball-swivel, the head, and the arm can be made rigid with respect to one another; the bore 7 also having flat surfaces like the surfaces 13.

The neck or boss 12 has a central threaded bore 14 to receive a tightening screw 15 to fasten the casing 1, the ball swivel 4, the head 5, and the arm 9 together. The working surfaces of the ball-swivel 4, the bulge 2, and recess 6 all match and are substantially spherical, so that when the screw 15 is tightened up it will draw the neck 12 and the ball swivel 4 inward of the head 5 to press against the bulge 2 and hold it firmly in the recess 6. Thus the casing 1 and the mirror can be held fast but can be adjusted in any direction and will remain in adjusted position until the operator loosens the screw 15 and turns the casing 1 to rotate the bulge 2 between the ball swivel 4 and the head 5 until the casing 1 assumes another position, whereupon the screw 15 is tightened again.

The end of the bore 7 adjacent the head of the screw 15 with a conical head is counterbored as shown at 16 and receives a hollow conical lock washer 17. Between the bulge 2 and the bottom of the recess 6 in the head is a curved spring washer 18 which prevents jarring from loosening the casing with the mirror and displacing the mirror out of its adjusted position.

The operation is such that nothing more than tightening and loosening the screw 15 is necessary. This screw is accessible and easy to move at all times. The engagement of the boss 12 with the recess 11 in the arm 9 will be sufficient to prevent rotation of the element 4, and the bore 7 need not have flat sides, but may be rounded.

In Figure 5 the arm 9' is integral with the head 5' and has a bore 7' to receive the neck 12 of the ball swivel 4, but the bore 8 is omitted. The neck 12 and bore or recess 7' have the same cross sectional form as described above in connection with Figures 1 and 3.

Though the invention has been described in detail and with respect to the forms disclosed herein, it is not limited to such details and forms and numerous changes may be made without departing from the essential construction and design of the invention.

The end of the bore 7 through which the screw 15 with conical head is inserted in the design shown at Figure 1 may be of such form that the head of the screw will fit the same, or the head of the screw 15 may be so shaped that it will fit the adjacent end of the bore and the washer 16.

The mirror M may be backed by suitable plates in the casing 1 to cushion it or for any other purpose and this mirror will be securely held in said casing.

The end of the detachable arm 9 remote from the opening 10 may have a boss 19 and a serrated shoulder 20 adjacent thereto, and extending inward through the boss 19 is a threaded hole 21 to enable this arm to be attached to a clamp by which the mirror is affixed to an autombile in the manner desired.

The neck or boss 12 is illustrated as enlarged at its outer end with a round flange or collar, flattened on two sides 13' as described. The boss may also be made without a collar and of the same diameter throughout, with two sides flat as shown. The flat sides 13' are presented edgewise in Figure 5.

Having described my invention, what I claim as new is:

1. The combination with a head having a rounded recess in one end, of a casing for a mirror having a hollow bulge on its rear face and seated in the recess, a ball-swivel element in said bulge, the head having a bore extending therethrough from said recess to the opposite end, the ball-swivel element having a neck in said bore terminating short of said end, the neck having flat lateral surfaces to prevent turning of the swivel element in the head, the neck of the swivel element having internal screw threads, a screw in said bore engaging said threads in the neck, a curved spring washer in said recess engaging said bulge, and an arm carrying said head, the arm being detachable from the latter, the head having a second bore intersecting the first and open at one side to receive the end of the arm, the latter having an opening in said end to receive the screw, one end of said opening having an enlarged recess with flat sides for fitting engagement with the flat sides of said neck.

2. The combination with a head having a rounded recess in one end, of a casing for a mirror having a hollow bulge on its rear face and seated in the recess, a ball-swivel element in said bulge, the head having a bore extending therethrough from said recess to the opposite end, the ball-swivel element having a neck in said bore terminating short of said end, the bore and neck having flat engaging surfaces to prevent turning of the swivel element in the head, the neck of the swivel element having internal screw threads, a screw having a conical head in the outer end of the bore, said bore engaging the said threads in the neck, a cone-shaped washer in the bore engaged by the head of said screw, a concave spring washer in said recess engaging said bulge, and an arm carrying said head.

JOSEPH M. ROBINS.

REFERENCES CITED

The following references are of record in the file of this patent:

UNITED STATES PATENTS

| Number | Name | Date |
|---|---|---|
| 1,435,310 | Kipper | Nov. 14, 1922 |
| 1,558,641 | Short | May 5, 1925 |